Dec. 25, 1962 H. V. WAHLIN 3,069,754
CONTINUOUS CELL CLOSING MACHINE AND METHOD
Filed June 16, 1958 6 Sheets-Sheet 1
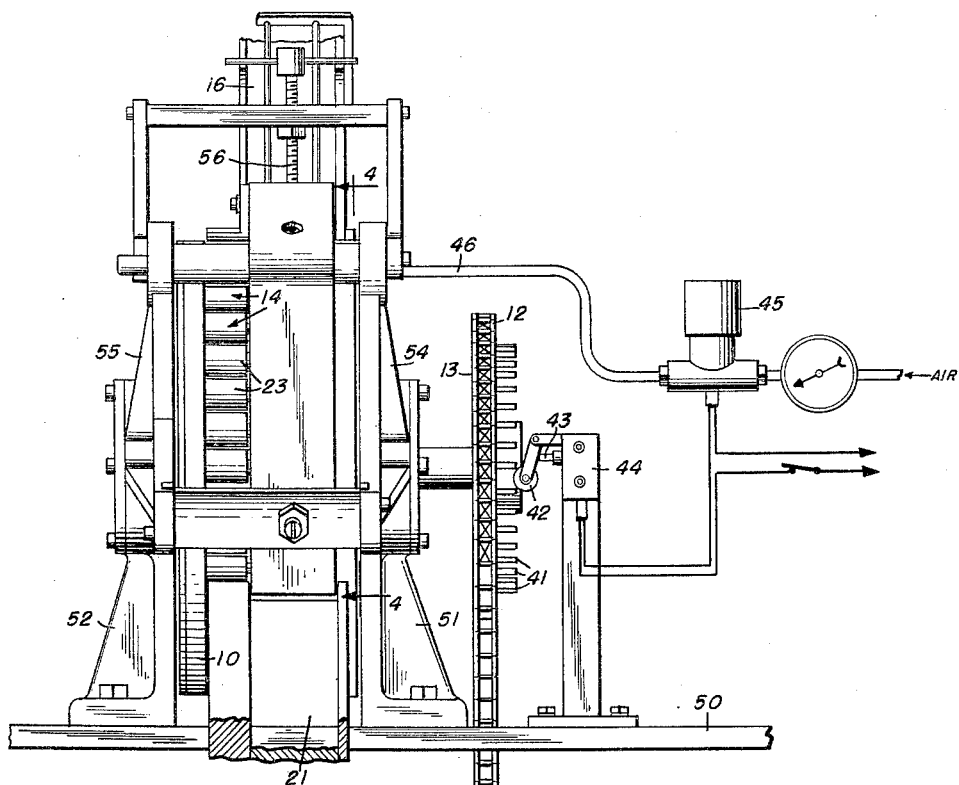
FIG. 1
INVENTOR
HAROLD V. WAHLIN
BY 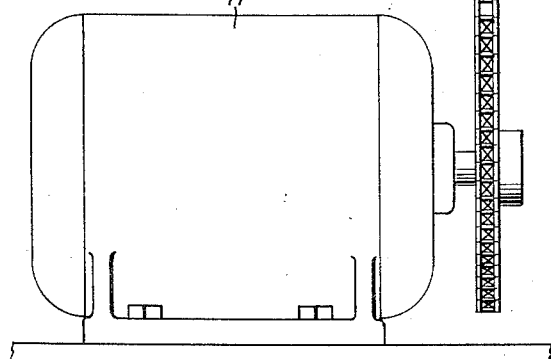
ATTORNEYS Dec. 25, 1962 H. V. WAHLIN 3,069,754
CONTINUOUS CELL CLOSING MACHINE AND METHOD
Filed June 16, 1958 6 Sheets-Sheet 2

INVENTOR
HAROLD V. WAHLIN
BY Beale & Jones
ATTORNEYS

Dec. 25, 1962   H. V. WAHLIN   3,069,754
CONTINUOUS CELL CLOSING MACHINE AND METHOD
Filed June 16, 1958   6 Sheets-Sheet 4

INVENTOR
HAROLD V. WAHLIN

BY *Beale & Jones*

ATTORNEYS

INVENTOR
HAROLD V. WAHLIN

BY Beale & Jones

ATTORNEYS

Dec. 25, 1962
H. V. WAHLIN
3,069,754
CONTINUOUS CELL CLOSING MACHINE AND METHOD
Filed June 16, 1958
6 Sheets-Sheet 6
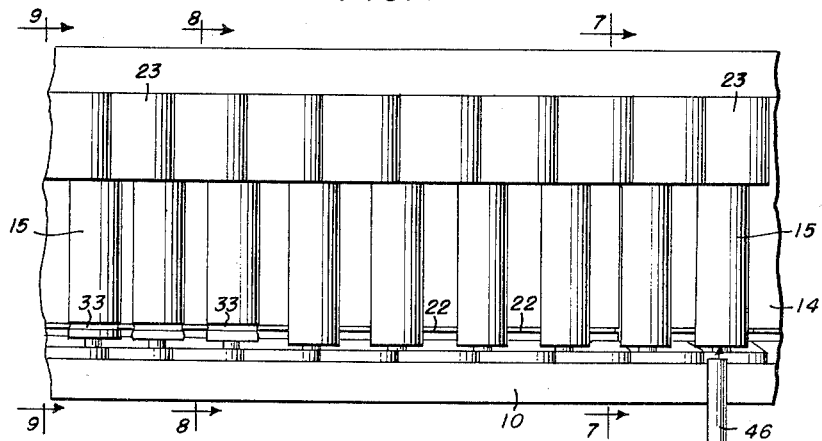
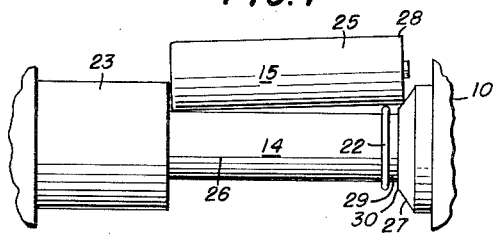
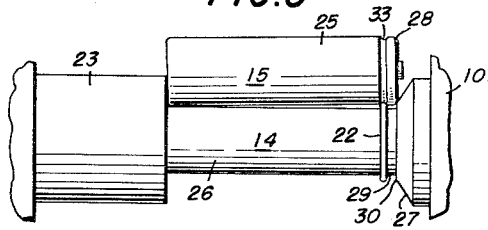
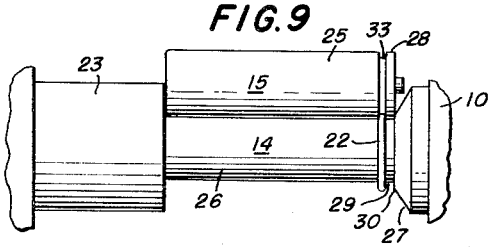
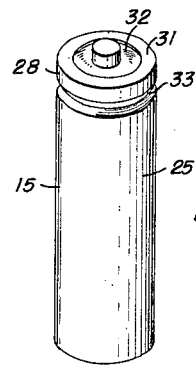
INVENTOR
HAROLD V. WAHLIN
BY Beale & Jones
ATTORNEYS

United States Patent Office 3,069,754
Patented Dec. 25, 1962

3,069,754
CONTINUOUS CELL CLOSING MACHINE
AND METHOD
Harold V. Wahlin, Madison, Wis., assignor to The Electric Storage Battery Company, Philadelphia, Pa., a corporation of New Jersey
Filed June 16, 1958, Ser. No. 742,313
16 Claims. (Cl. 29—155.55)

This invention relates to a novel mechanism for rapidly and continuously closing a dry cell. More specifically, this invention relates to a device for indenting a zinc, cup-shaped container electrode of a dry cell to form an annular bead therein, and simultaneously curling over the top edge of the side wall of the zinc container, thereby forming two inturned portions on the interior of the container between which there may be tightly gripped a plastic sealing washer which produces a tight seal, thereby closing the cell.

This machine is particularly adapted for the production of dry cells having a structure described in a copending application. An important feature in the dry cell construction described therein is the provision of a synthetic plastic sealing washer, such as a polyethylene disc, as the top closure means in the cell. The polyethylene washer is a relatively thick disc which is seated upon an annular bead disposed adjacent the upper edge of the side wall of the zinc cup-shaped electrode. During the closing of the cell, the polyethylene sealing washer is placed under slight compression as it is crimped between the annular bead and the curled-in upper edge of the side wall of the zinc cup-shaped electrode. Since the polyethylene washer is semi-rigid, it is urged into a close sealing engagement with the carbon pencil electrode which is centrally disposed in the cell and over which the polyethylene sealing washer is impaled. As described in detail in the copending application referred to above, this sealed dry cell is then enclosed in an insulating tube, which is in turn enclosed within a metallic jacket provided with a metallic bottom closure disc and a metallic closure cap to produce a leak-resistant dry cell.

In the manufacture of a dry cell having the structure described above, there are a plurality of somewhat conventional manufacturing steps leading up to the final closure step with which the present invention is concerned. First, the zinc cup-shaped electrode is protected by the insertion over the bottom of the electrode of a washer of asphaltic material. Next, the carbon pencil electrode and depolarizer mix are positioned over the protective washer within the container electrode. The carbon pencil electrode rests on the protective asphaltic washer. An electrolyte is then poured in, and may then be gelled if desired. At this point in the cell assembly, the relatively thick plastic sealing washer may be impaled over the carbon pencil electrode and may be positioned slightly below the upper edge of the side wall of the zinc container electrode. Some reasonable deviation in the vertical positioning of the plastic sealing washer is permissible, since the gradual working inward of the walls of the container electrode in the subsequent assembly steps will ease the washer into its proper final place. Supporting means for the undersurface of the plastic sealing washer and a securing means for retaining the plastic sealing washer permanently in position are next provided. Most desirably, an annular bead immediately below the plastic sealing washer is provided, and the upper edge of the side wall of the zinc container electrode is curled over the upper surface of the washer. The plastic sealing washer is thus gripped between the annular bead and the curled-over upper edge of the side wall.

An object of the present invention is to provide a machine for continuously and automatically simultaneously rolling an annular bead in a zinc container electrode of a dry cell immediately beneath the undersurface of a plastic sealing washer impaled over the carbon electrode in the dry cell, and curling over the upper edge of the side wall of the zinc container electrode to provide a restraining means preventing dislodgement of the plastic sealing washer from its position.

Another object of the invention is to provide a method and apparatus for continuously crimping a plastic sealing washer, positioned as a closure in a dry cell container electrode, between inwardly directed projections in the side wall of the container electrode.

A still further object of the invention is to provide a method and apparatus for continuously closing a dry cell, in which a plastic sealing washer is impaled over a centrally disposed pencil electrode within a zinc container electrode, by indenting a portion of the side wall of the zinc container electrode to form an annular bead, and simultaneously turning in the upper edge of the side wall of the zinc container electrode into abutting engagement with the upper surface plastic sealing washer, so that the plastic sealing washer is gripped between two opposing surfaces under mild compression, and is forced into snug contact with the carbon pencil electrode.

These and other objects of the invention are achieved in a continuous cell closing machine in which the cells are fed in partially assembled state through a feeding chute onto a wheel carrying spinning rollers around its periphery which perform the spinning or closing operation. When the cells are fed to the wheel, the plastic sealing washer is positioned within the container electrode a short distance below the upper edge of the side wall of the zinc container electrode, impaled over the carbon pencil electrode. The spinning rollers are disposed in uniformly spaced relation about the periphery of a wheel, with the spacing between adjacent spinning rollers being such that a single cell is accommodated between two adjacent spinning rollers. Immediately after leaving the feeding chute, each cell is properly positioned with respect to the spinning rollers by a blast of air which seats each cell firmly against a stop shoulder. Each cell then passes under a shoe, which is an arcuate, substantially planar surface, generally following the circumference of a circle having the same center of curvature as the wheel upon which the spinning rollers are located. During the first approximately 30 degrees of rotation of the wheel, the shoe has a gradually decreasing radius, so that the cell is brought into engagement with the spinning rollers quite gradually. The radius of the surface of the shoe is constant throughout the rest of its arc. The entire shoe is preferably from about 150° to 180° in length around the surface of the wheel. As each cell is brought in contact with the spinning rollers, by rotation of the wheel and passage under the shoe, its close engagement with the surface of the shoe causes a rotation of the cell. Preferably, the frictional engagement between the cell and the surface of the shoe is enhanced by providing a facing on the shoe, of rubber or a similar material. Since the spinning rollers are freely rotatably mounted, the rotation of each cell causes the rotation of the two spinning rollers with which it is engaged. The spinning rollers are so contoured as to cause the formation in the container electrode of an annular bead immediately under the lower surface of the plastic sealing washer, and an inturned or curled over end flange formed by the upper edge of the side wall of the zinc container electrode.

Since the zinc container electrode is extremely soft, it is readily worked, and an increase in the length of the travel of the cell between the spinning rollers and the shoe tends to produce a finer, more perfect finish in the rolled portions of the cell. The closed cells are discharged from the wheel through a discharge chute, from which they are taken through any further manufacturing operations which may be desired.

The details of the construction of this machine may be best understood by a consideration of the drawings, in which:

FIG. 1 is a front elevation of the continuous closing machine;

FIG. 6 is a top plan view of the wheel, spinning rollers, and the cells in position on the spinning rollers, with the shoe cut away to show the progressive working of the zinc container electrode caused by the spinning rollers;

Figure 2:
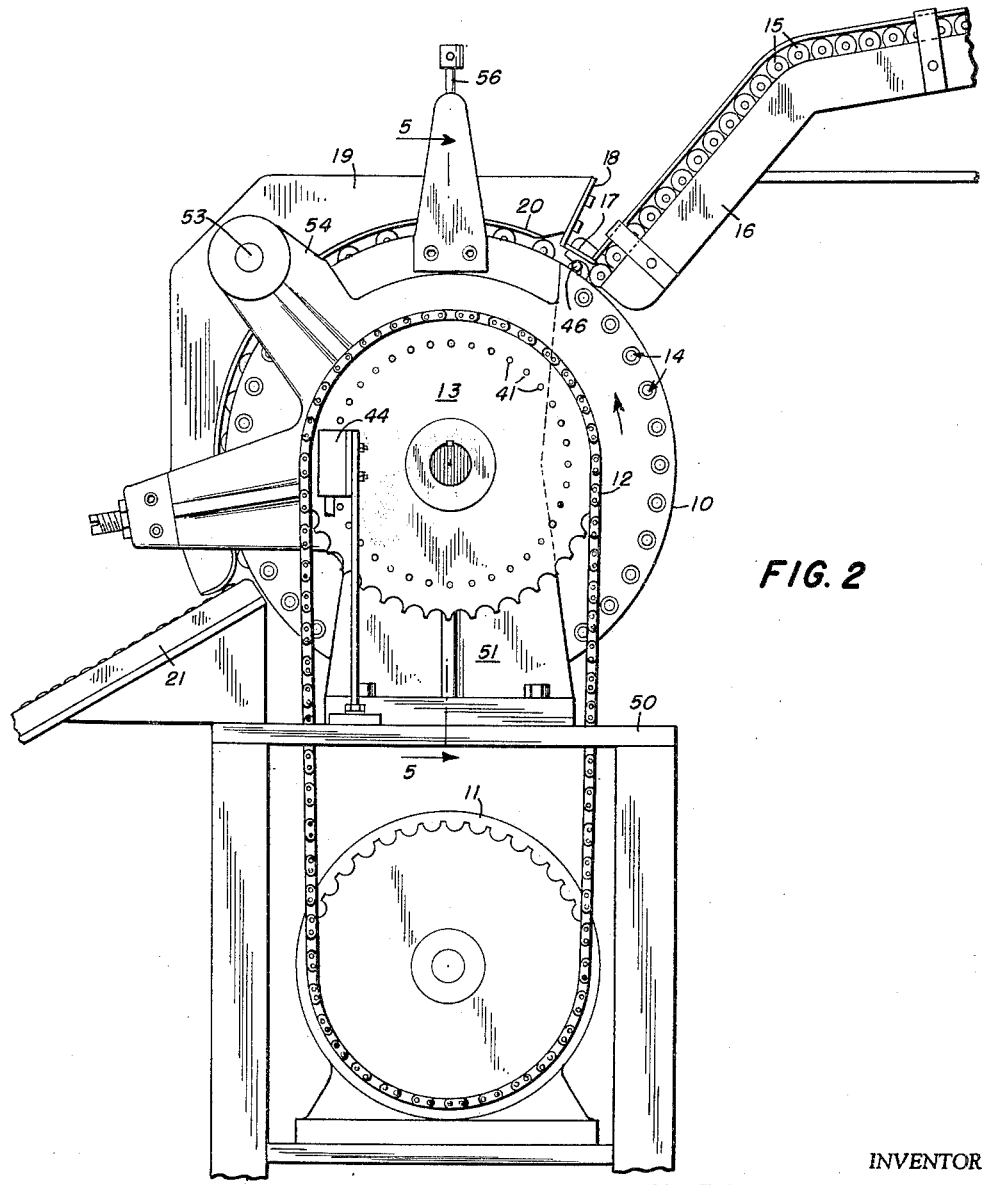
FIG. 2 is a side elevation of the continuous cell closing machine.
Figure 3:
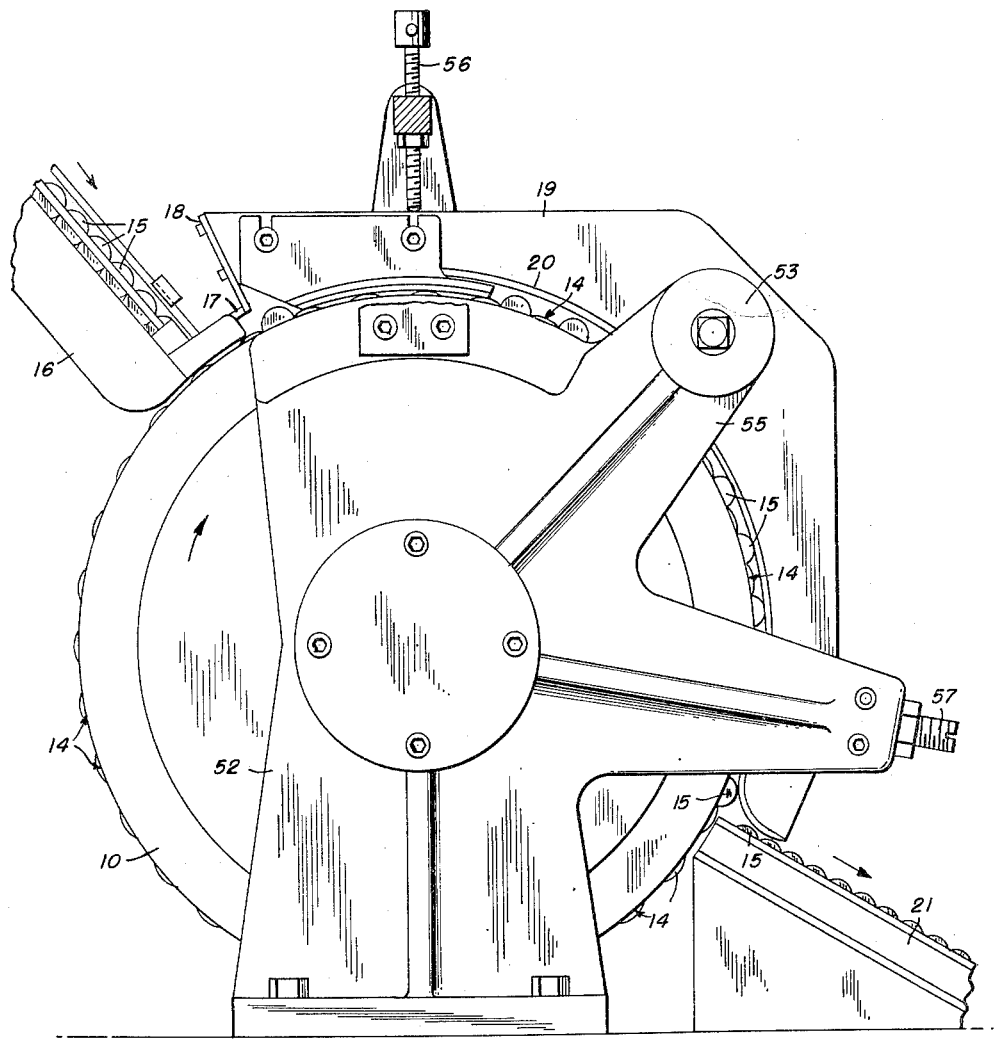
FIG. 3 is a side elevation of the oposite side of the cell closing machine to that illustrated in FIG. 2.
Figure 4:
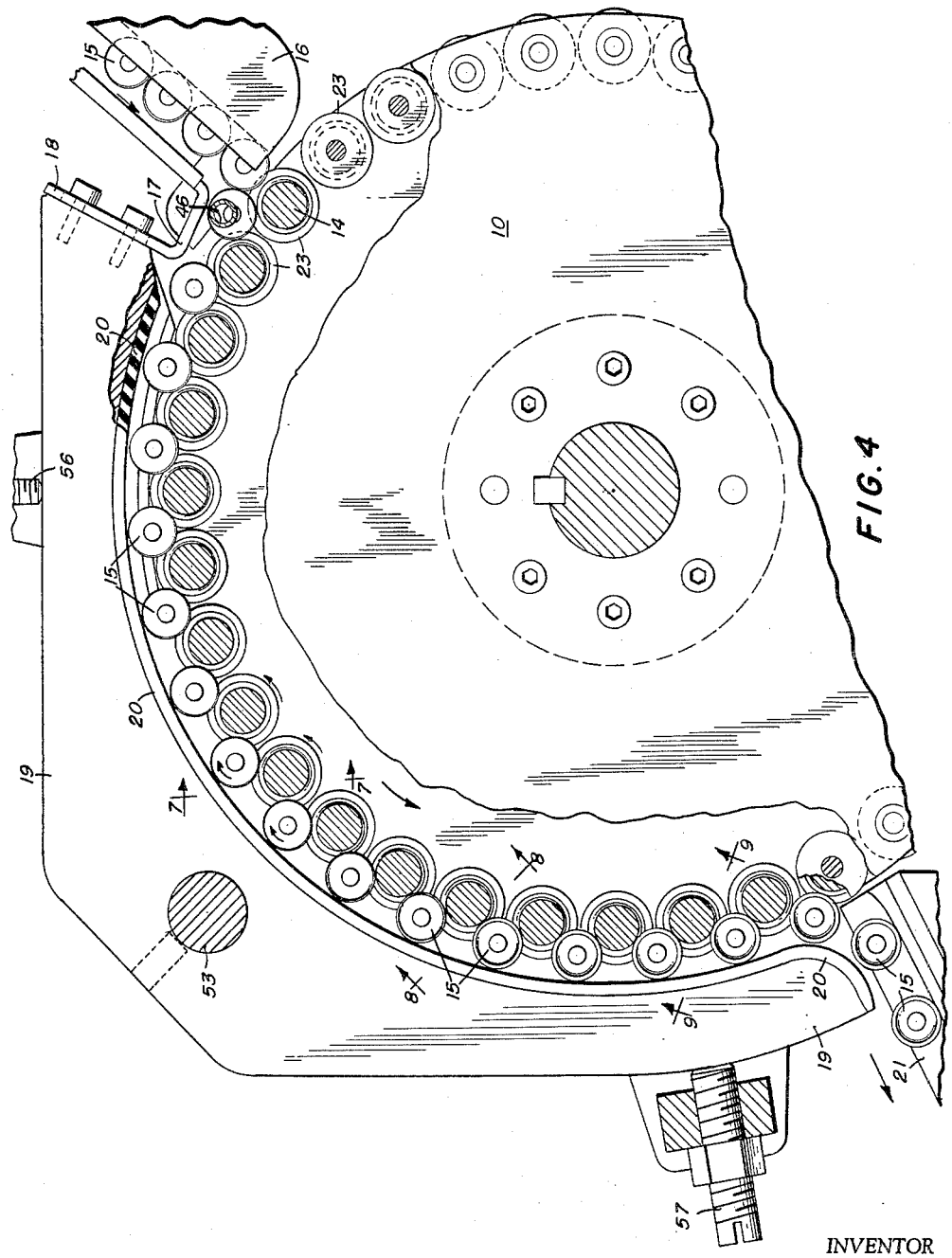
FIG. 4 is a side elevation in partial section taken on line 4—4 of FIG. 1.
Figure 5:
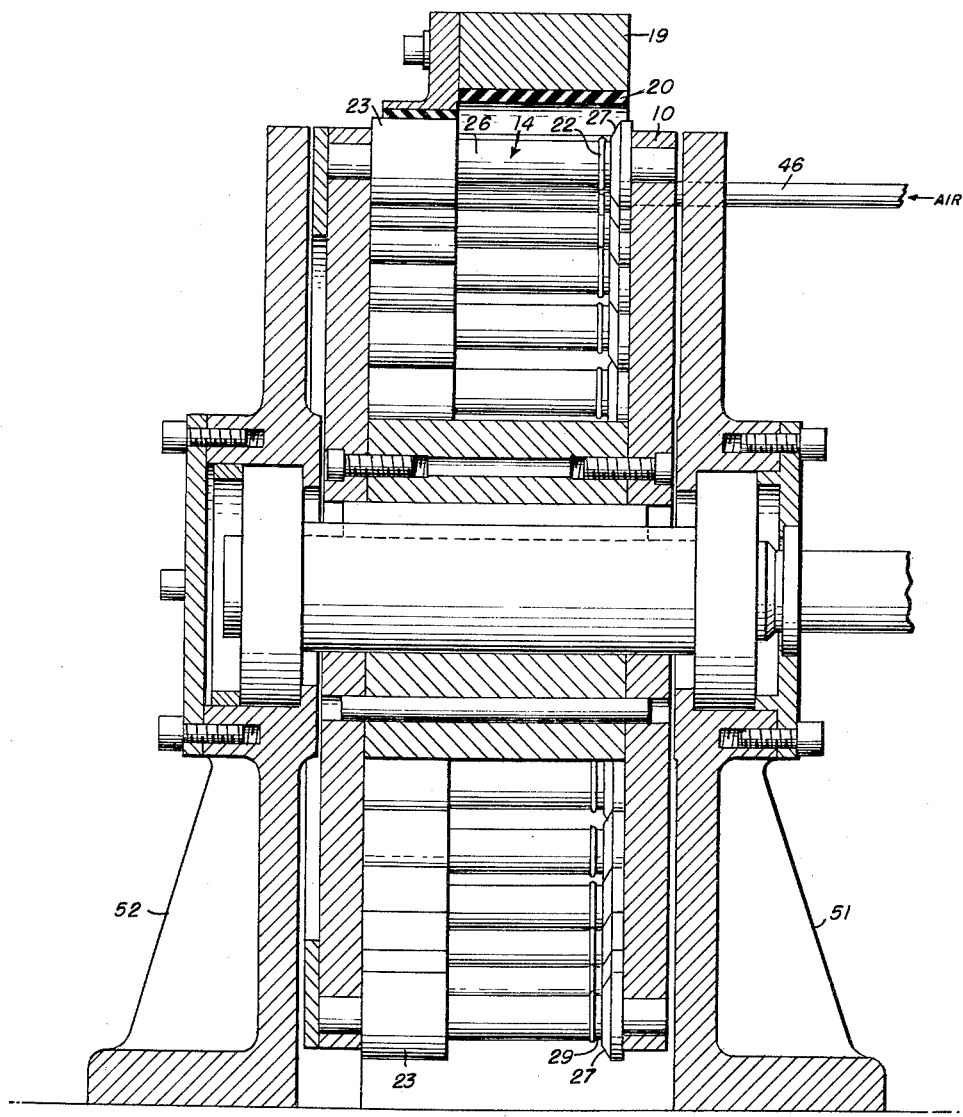
FIG. 5 is a front elevation in section taken on line 5—5 of FIG. 2.

FIGS. 7, 8 and 9 are side elevational views taken on lines 7—7, 8—8, and 9—9 of FIG. 4, respectively, to show the progressive working of the zinc container electrode caused by the spinning rollers;

FIG. 10 is a perspective view of a finished cell.

Referring now specifically to the drawings, the only driven element in the continuous cell closing machine is a wheel 10 which is continuously rotated at a governable rate of speed by a motor 11 through a conventional chain 12 and sprocket 13. Mounted around the periphery of the wheel 10 are a plurality of spinning rollers 14 which are uniformly spaced around the circumference of the wheel. Each of the spinning rollers 14 is mounted on the wheel 10 so as to be freely rotatable. Dry cells 15 which are ready for final closure are passed down a delivery chute 16, from which they are fed to the surface of the wheel. The spinning rollers 14 are so spaced that only one cell 15 is spaced between each two adjacent spinning rollers. This distribution is also regulated, in part, by a distribution plate 17 projecting from the side plate 18 of the shoe 19. As the unclosed cells leave the delivery chute 16, each cell passes beneath the distribution plate 17, and then under the facing 20 on the shoe 19. The facing 20 is desirably a high friction material such as rubber, which retards any sliding between the contacting surfaces of the facing 20 and the unclosed dry cells 15. During the first approximately 30 degrees of rotation of the wheel 10, the radius of the shoe 19 and its facing 20 gradually decreases so as to bring the cells into intimate engagement with the spinning rollers 14. During the remainder of the rotation of the wheel 10, until the cells are released from the wheel 10 at the discharge chute 21, the spacing between the spinning rollers 14 and the opposed surface of the facing 20 is uniform. During their passage along this space, the dry cells are continuously worked and experience has shown that the zinc is sufficiently soft as to respond to the additional working by conforming increasingly closely to the contours of the spinning rollers.

The rotation of the wheel 10 carries the cells along the surface of the facing 20, and their close engagement with the surface of the facing 20 causes a rotation of each cell. The rotation of each cell in turn imparts a corresponding, although oppositely directed, rotation to each spinning roller with which it is in contact. The desired contours in the tubular zinc container of the dry cell are thus continously imparted to each zinc container by the projections 22 on each spinning roller.

As each unclosed dry cell 15 is passed down the delivery chute 16, each cell comes to rest against a spinning roller 14, referring specifically to FIG. 4. A distribution plate 17 is positioned adjacent the discharge opening of the delivery chute and regulates the discharge of dry cells from this chute so that one unclosed dry cell 15 is positioned between each two adjacent spinning rollers 14. The cells then are carried under the facing 20 on the shoe 19, which is of variable radius during the first approximately 30 degrees of travel of the wheel 10. Thus, as shown in FIG. 7, during the passage of the dry cells under the facing 20 in this region, little actual spinning takes place, and the cells are merely brought gradually into engagement with the spinning rollers 14.

Just as the cells 14 discharge from the delivery chute, each cell is met by a blast of air which urges it back into engagement with a stop shoulder 23, which accurately positions the cell with respect to the spinning rollers 14.

As the wheel then continues to rotate, the spacing between the spinning rollers 14 and the surface of the facing 20 on the shoe 19 becomes such as to force each cell 15 into full engagement with each spinning roller, as illustrated, for example, in FIG. 8. Desirably, the relationship between the diameter of the wheel 10 and the diameter of each cell 15 is such that within approximately 30 degrees of travel after the radius of the facing 20 has decreased to the point where it becomes uniform, the essential working of the zinc container of the cell has been completed. During subsequent travel of each cell beneath the shoe 10, the prolonged contact with the spinning rollers produces additional working of the zinc container 25, because of the extreme softness of the zinc. This additional working tends to cause the zinc container 25 to conform more closely to the contour of the spinning rollers, and produces a squared-off appearance in the zinc container. It has been found that an additional passage through the machine enhances this squared-off appearance to an even greater degree.

In order to accomplish the annular beading and curling-over of the zinc container 25 of each dry cell, in accordance with the objects of this invention, each spinning roller 14 is provided with a flat, smooth, polished cylindrical body portion 26, which engages the exterior surface of the zinc container 25 and functions as a bearing surface. At the point where it is desired to produce the annular bead in the zinc container, a circumferential ridge 22 is provided in the surface of the spinning roller 14. The circumferential ridge 22 corresponds precisely in depth and shape to the exterior of the annular bead which it is desired to produce in the zinc container 25. In order to curl over the upper edge of the side wall of the zinc container 25, each spinning roller is provided with a chamfer 27 which accomplishes a gradual turning-in or curling over of the upper edge of the side wall during the early stages of rotation of each cell under the shoe 19. As each cell is forced into a closer engagement with each spinning roller, each cell is gradually forced into flush engagement with the cylindrical flat portion 26 of the spinning roller 14, and the upper edge of the cell 28, containing the plastic sealing washer, is gradually forced into the valley 29 between the circumferential ridge 22 on the sealing roller and an oppositely-disposed sharp shoulder 30, in which the chamfer 27 terminates. In the spinning or rolling process, the upper edge of the zinc container 25 gradually moves down the chamfer 27 as the curling step proceeds, into engagement with the squared-off shoulder 30, which is at right angles to the flat cylindrical body 26 of the spinning rollers. The additional working of the upper portion of the cell in this square recess or valley 29 imparts to the cell its squared-off appearance.

Depending upon the degree of working, and the angularity of the chamfer 27, the curled over end portion 31 of the side walls of the zinc container 25 will compress or bite into the plastic sealing washer 32. The annular bead 33 will engage the undersurface of the relatively thick plastic sealing washer 32, and will hold it in position. After the initial formation of the annular bead 33 and the curled-over end flange 31, no additional pressure is applied during the passage of the cell between the spinning rollers 14 and the facing 20 on the shoe 19. The additional working which squares off the zinc container 25 due to its extreme softness does not substantially alter the crimping engagement of the plastic sealing washer 32 by these inturned portions of the zinc container 25.

Referring now to FIG. 1, there are disposed around the sprocket 13, a plurality of studs 41 which are a part of a timing mechanism for the air blasts which serve to position the cells as they are fed from the delivery chute 16 onto the wheel 10. The studs 41 are so disposed on the sprocket 13 that a wheel 42, which rides in a path over the studs 41, is cammed by each stud at the instant that a cell is delivered between its two supporting spinning rollers 14 on the wheel 10 from the delivery chute 16. The cammed movement of the timing wheel 42 may actuate a lever 43, which in turn may control a suitable mechanism 44, which serves to actuate the air blasts through any suitable control mechanism 45. The blast delivered by the compressed air line 46 causes the bottom of the dry cell 15 to abut against the stop shoulder 23, which serves as a gauge for controlling the height of the finished cell.

The wheel 10 and the frame 19 may be supported from a common frame 50 by a pair of oppositely-disposed framing members 51 and 52, one on each side of the wheel 10. For ease in mounting and in making final adjustments, the shoe 19 is desirably mounted on a pivot 53 which is centrally located with respect to the center of gravity of the shoe 19, the pivot 53 being suspended between the centrally projecting arms 54 and 55 of the two supporting members 51 and 52, respectively. Final adjustments between the facing 20 of the shoe 19 and the spinning rollers 14 may be accomplished through rotation of an adjusting screw 56 mounted adjacent the input area of the shoe 19, and through rotation of a corresponding second adjusting screw 57 at the discharge end of the shoe 19. Permanent slotted supports (not illustrated) are preferably provided in the framing members 51 and 52, respectively, adjacent the adjusting bolts 56 and 57, so that the adjustment bolts themselves do not carry any load, but merely serve as adjusting means.

There has thus been described a specific embodiment of the invention of a continuous cell closing machine. It should be understood that the above description is made for purposes of illustrating the invention only, and the above description should not be construed as limiting the invention in any way. Many modifications of the invention will occur to those skilled in the art which are, nevertheless, within the contemplation of the invention as it is defined in the accompanying claims. Thus, for example while the facing has been described as composed of rubber, any similar material which would decrease any tendency of the cell casing to slide along the face of the shoe could be employed, such as, for example, synthetic plastic compositions, synthetic rubber compositions, mixtures of natural and synthetic rubbers, impregnated cloth, and various other types of facing materials. Similarly, the arcuate area in which work is performed on the zinc casing could be either increased or decreased, depending upon the specific results desired. A decrease in the working area would result in a cell having a good closure, but a rounded appearance. An increase in the working of the zinc casing, as has been pointed out earlier in the specification, promotes a squared-off appearance, despite the fact that no additional pressure is applied to the zinc casing. The extreme softness of the zinc allows it to be worked quite readily.

While the shoe has been described as having a gradually decreasing radius, it will be understood that the variable spacing desired between the surface of the shoe and the spinning rollers can be achieved by proper adjustment of a shoe split at the pivot point and having a uniform radius over its entire length. If desired the width of the shoe may be increased in the lead area or a separate shorter shoe may be provided to hold down the back edge of the cells while the cells are in the cocked position on the spinning rollers shown in FIG. 7.

We claim:
1. A method of forming a tight seal in a dry cell having a metallic container electrode; said container electrode having a side wall with an upper edge extending above a compressible plastic sealing washer, said container electrode containing electrolyte, depolarizer mix, a second centrally disposed protruding electrode, and said sealing washer; said method comprising forming an annular indented bead on the side wall of said container electrode immediately below said sealing washer and simultaneously curling over the upper edge of the side wall of said container electrode into gripping engagement with said sealing washer; whereby said plastic sealing washer is gripped under mild compression between said indented bead and said curled over upper edge of the side wall to force the plastic sealing washer into a tight engagement with said centrally disposed electrode and obtain a tight closure of said cell.

2. A method of obtaining a tight seal in a cylindrical dry cell having a zinc container electrode; said container electrode having a side wall with an upper edge extending above semi-rigid, relatively thick compressible plastic sealing washer; said container electrode containing electrolyte, depolarizer mix, a centrally disposed carbon pencil electrode, and said sealing washer; said method comprising rotating said container electrode in frictional engagement with freely rotating, contoured rollers; said contours being adapted to form an indented, annular bead on said container electrode immediately below said sealing washer; and simultaneously therewith curling over the upper edge of the side wall of said container electrode; whereby said sealing washer is crimped between said indented portion of said container electrode and the curled over upper edge of the side wall of said container electrode to urge said sealing washer into tight engagement with said carbon pencil electrode and form a tight seal for the cell.

3. A mechanical apparatus for crimping and closing the tubular metallic container of a dry cell comprising a rotatable wheel having a plurality of freely rotatable spinning rollers uniformly spaced along the periphery thereof, a shoe mounted above the wheel presenting a face opposed to said spinning rollers and forming a path between the said face and the spinning rollers, a friction facing covering said face, to face of said shoe having a gradually decreasing radius over a minor arcuate portion thereof to provide a lead area in said path adjacent the entrance to said path in which a tubular metallic dry cell container to be worked on in said path may be gradually brought to engagement with the said spinning rollers by contact with the facing on the face of said shoe, said face having a substantially uniform radius over the remainder of said path to form a working area in which the tubular metallic dry cell containers are forced into rotating engagement with the spinning rollers by their movement along the surface of the friction facing, each roller having disposed at one end thereof an annular bead and an adjacent chamfered shoulder, whereby the end of said tubular metallic dry cell container may be simultaneously indented along the side wall thereof and curled over at the top edge thereof.

4. The mechanical apparatus of claim 3 in which the said friction facing comprises a layer of rubber secured to the shoe face.

5. The mechanical apparatus of claim 3 in which the lead area comprises an arcuate portion of the total path equivalent to approximately 30°.

6. The mechanical apparatus of claim 3 in which the lead area comprises an arcuate portion of the total path equivalent to approximately 30°, and the working area comprises an arcuate portion of the total path equivalent to approximately 150°.

7. The mechanical apparatus of claim 3 including stop means for positioning the tubular articles with respect to said spinning rollers.

8. The mechanical apparatus of claim 7 including, adjacent the beginning of the lead area of said path, a positioning means adapted to urge the tubular articles into contact with the said stop means.

9. An apparatus for closing cylindrical dry cell batteries comprising a stationary frame, a wheel rotatably mounted on said frame, a plurality of similarly contoured spinning rollers having axes parallel to the axis of said wheel, being journaled for free rotation at closely spaced points about the periphery of the wheel, and being so contoured as to provide bead-forming and crimp-forming surfaces at one end thereof, a shoe member adjustably mounted on said frame and having on its underside an arcuate frictional face flat in transverse cross section and spaced from said wheel but being substantially concentric with said wheel, means to rotate said wheel, whereby such dry cell batteries each riding on two adjacent rollers as said wheel rotates pass between the shoe and the wheel and are made by the frictional surface to rotate against said rollers in compressive engagement therewith, forming, as rotation progresses, a contour on such battery complementing the contour of said spinning rollers.

10. An apparatus for closing dry cell batteries as described in claim 9 wherein each of said rollers is provided adjacent one end with an annular stop shoulder, and wherein pressure means urge such batteries toward said annular stop shoulders to position said batteries for selected compressive engagement therewith.

11. An apparatus for closing dry cell batteries as defined in claim 10 wherein said pressure means comprises means for applying a blast of air at each battery in a direction toward said annular shoulders.

12. A machine for closing cylindrical dry cell batteries which batteries comprise an unsealed cup electrode which contains electrolyte, depolarizer, a pencil electrode and also an insulating washer disposed adjacent the open end of said cup electrode, comprising, a continuously rotating wheel adjacent the outer periphery of which are mounted a plurality of uniformly spaced, freely rotatable rollers, the axes of which are parallel to the axis of said wheel, each of said rollers having adjacent one end thereof, an enlarged peripheral shoulder, and adjacent the other end thereof a raised annular bead and outwardly spaced therefrom, an annular chamfered shoulder, an arcuate stationary shoe mounted exterior of part of the periphery of said rotating wheel, substantially concentric therewith and radially spaced therefrom, magazine means for continuously feeding cylindrical unsealed dry cell batteries into the annular space between said wheel and said shoe in axial alignment with said rollers and at a rate such that an unsealed dry cell battery rests between each two adjacent rollers with the open end of the said cup electrode being adjacent the said chamfered shoulders of said rollers, means on said shoe for imparting frictionally induced rotary movement to each dry cell battery and for progressively forcing said open end of said electrode into bead-forming engagement with said annular beads on said rollers and into cup-crimping engagement with said chamfered shoulders on said rollers, whereby an inwardly directed annular bead is formed in said electrode cup below said insulating washer and, simultaneously an inwardly directed annular crimp is formed in said electrode cup above said insulating washer, and said battery is closed.

13. A machine as defined in claim 12 wherein the means on said shoe for imparting frictionally induced rotary movement to said batteries comprises a surface of plastic, rubber-like material.

14. A machine as defined in claim 12 wherein the space between the inner surface of said shoe and the periphery of said wheel is reduced in part whereby axial rotation of each battery is induced and the bottom-closing beads and crimps are formed about the entire periphery of each battery.

15. A machine as defined in claim 12 wherein means are provided for urging each battery against the stops provided by the said enlarged annular shoulders on said rollers after the battery has been discharged from said magazine means.

16. In a machine for closing filled, cylindrical dry cell batteries, the improvement which comprises a shoe provided with a rotation inducing surface adapted to bear upon the outer wall of a said dry cell battery and urge said battery into bead forming and battery closing lateral engagement with the rotating surface of freely rotating contoured rollers which are disposed in spaced axial alignment with respect to each other and in axial alignment with said cylindrical dry cell batteries.

References Cited in the file of this patent

UNITED STATES PATENTS

| | | |
|---|---|---|
| 1,212,325 | Clark | Jan. 16, 1917 |
| 1,366,717 | Clark | Jan. 25, 1921 |
| 1,430,728 | Olaneta | Oct. 3, 1922 |
| 1,596,538 | Ingram | Aug. 17, 1926 |
| 1,657,101 | Zeitlin | Jan. 24, 1928 |
| 1,780,139 | Schmidt | Oct. 28, 1930 |
| 1,780,982 | Schmidt | Nov. 11, 1930 |
| 1,947,756 | Cadman | Feb. 20, 1934 |
| 2,167,654 | Hothersall | Aug. 1, 1939 |
| 2,591,442 | Hulbert | Apr. 1, 1952 |
| 2,776,467 | Brennan | Jan. 8, 1957 |
| 2,797,472 | Kosche | July 2, 1957 |